UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

MONOCHLOROMONOBROMO DERIVATIVES OF INDIGO AND PROCESS OF MAKING SAME.

No. 872,280.　　　Specification of Letters Patent.　　Patented Nov. 26, 1907.

Application filed June 14, 1907. Serial No. 378,931.

*To all whom it may concern:*

Be it known that I, GADIENT ENGI, chemist and doctor of philosophy, a citizen of the Swiss Republic, and resident of Basel, Switzerland, have invented new and useful Monochloromonobromo Derivatives of Indigo and a Process for the Manufacture of the Same, of which the following is a full, clear, and exact specification.

In an application for United States Letters Patent executed at the same time as the present one, I have described the manufacture of mixed tri- and tetrahalogen derivatives of indigo, consisting in treating mono- or dichloroderivatives of indigo with the required quantity of bromin. I have further found that in an analogous manner mixed dihalogenderivatives of indigo, that is to say, monochloromonobromoderivatives of indigo can be obtained by brominating the known monochloroderivatives of indigo (resulting from the reaction of chlorin on indigo) with 2 atomic proportions of bromin in presence of a suitable indifferent diluent or solvent. The manufacture of these new monochloromonobromoderivatives of indigo is illustrated by the following example:

Example: 10 parts of monochlorindigo (prepared for instance by chlorinating indigo in nitrobenzene) are suspended in 100 parts of nitrobenzene and 5, 4 to 6 parts (the theoretical quantity for 2 atomic proportions is 5, 4 parts) of bromin and the whole is heated for about 2 hours in a reflux apparatus, on an oil bath, to a temperature of 226° C., this being the temperature of the oil bath. After cooling and filtering, the solid matter is washed with alcohol and dried, there being obtained a good yield of monochlor-monobromindigo in the form of a blue crystalline powder. It dissolves in concentrated sulfuric acid to a yellowish-green solution, which passes in the course of the time to a bluish green. Fuming sulfuric acid dissolves the dyestuff with a blue coloration; it is nearly insoluble in alcohol and benzene even when hot, sufficiently soluble in hot anilin with greenish-blue coloration and in hot nitrobenzene with pure blue coloration. By its treatment with alkaline reducing agents particularly with soda lye and sodium hydrosulfite, the dyestuff yields a limpid, clear yellow vat dyeing cotton vivid reddish blue tints of an excellent fastness to washing, chlorin and light.

What I claim is:

1. The described process for the manufacture of monochloromonobromoderivatives of indigo consisting in treating a monochlorindigo with two atomic proportions of bromin in presence of a suitable indifferent medium.

2. The described process for the manufacture of monochloromonobromoderivatives of indigo consisting in treating a monochlorindigo with two atomic proportions of bromin in presence of nitrobenzene.

3. As new products the monochloromonobromoderivatives of indigo constituting, in dry state, blue crystalline powders nearly insoluble in alcohol and benzene, sufficiently soluble in hot anilin with a yellowish blue coloration and in hot nitrobenzene with a pure blue coloration, soluble in concentrated sulfuric acid with a yellowish-green coloration turning to a blueish-green in the course of the time, soluble in fuming sulfuric acid with a blue coloration and yielding by their treatment with reducing agents yellowish vats dyeing cotton vivid reddish blue tints fast to washing, chlorin and light.

In witness whereof I have hereunto signed my name this 4 day of June 1907, in the presence of two subscribing witnesses.

GADIENT ENGI.

Witnesses:
　GEO. GIFFORD,
　AMAND RITTER.